United States Patent [19]
Winters

[11] 3,711,985
[45] Jan. 23, 1973

[54] FISHING ACCESSORY AND METHOD

[76] Inventor: Theron C. Winters, 1337 Wayburn, Grosse Pointe, Mich. 48230

[22] Filed: Feb. 3, 1971

[21] Appl. No.: 112,184

[52] U.S. Cl. ............................... 43/25.2, 43/57.5 R
[51] Int. Cl. .............................................. A01k 97/06
[58] Field of Search .......... 43/25.2, 25, 23, 41.2, 57.5

[56] References Cited

UNITED STATES PATENTS

| | | | |
|---|---|---|---|
| 2,699,623 | 1/1955 | Pragalz | 43/25.2 |
| 2,910,798 | 11/1959 | Bias | 43/41.2 |
| 2,729,913 | 1/1956 | Holwerda | 43/57.5 |
| 3,224,134 | 12/1965 | Holcombe | 43/57.5 |
| 2,634,541 | 4/1953 | Adams | 43/57.5 |
| 2,742,728 | 4/1956 | Boyd | 43/25.2 |
| 3,086,312 | 4/1963 | Davis | 43/25.2 |

Primary Examiner—Warner H. Camp
Attorney—Whittemore, Hulbert & Belknap

[57] ABSTRACT

A fishing accessory for holding fishing lines during baiting and for attachment to a fishing pole to store hooks and sinkers when not in use, comprising an elongated, hollow, cylindrical casing closed at one end and a hollow tubular member adapted to be slidably inserted within said casing. The casing is open at the other end to receive the hooks and sinkers, to fit over the handle of the fishing pole with which the accessory is used, and to allow the insertion thereinto and removal therefrom of the tubular member by means of which said hooks and sinkers may be secured within the casing.

7 Claims, 8 Drawing Figures

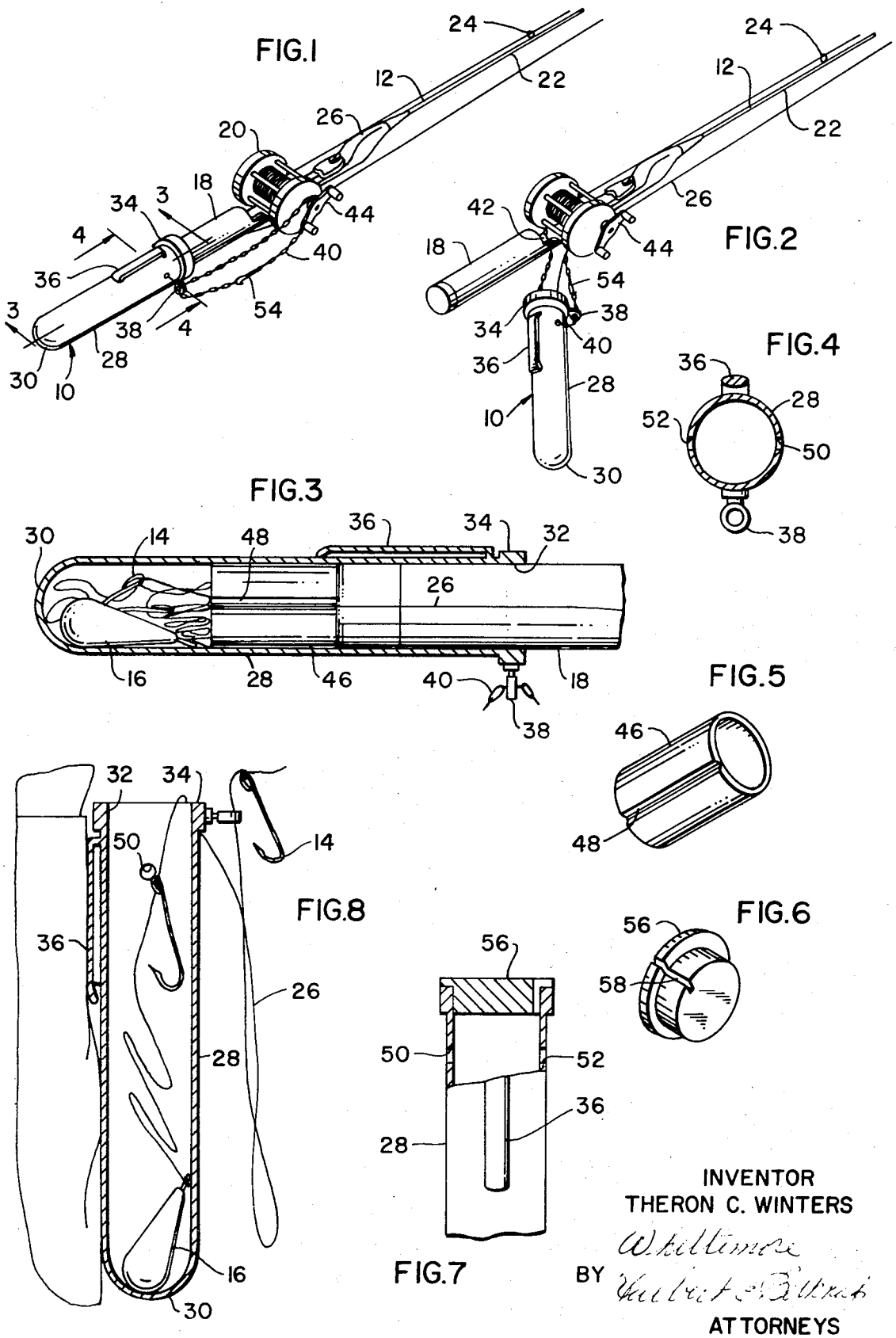

FISHING ACCESSORY AND METHOD

BACKGROUND OF THE INVENTION

1. FIELD OF THE INVENTION

The present invention relates to fishing accessories and refers more specifically to a device for holding lures and sinkers during baiting and alternatively for storing hooks and sinkers on the fishing pole when not in use.

2. DESCRIPTION OF THE PRIOR ART

Previous to the present invention, many difficulties were encountered by a fisherman in baiting his hooks or in moving to a new location. Whenever it became necessary to bait fishing hooks, a fisherman had to undertake a series of inconvenient maneuvers in order to accomplish his purpose, since the sinker weight usually tended to pull the hooks out of the fisherman's hands during the process of baiting. In changing his location the fisherman had two alternatives: he could either remove his hooks from the line every time he wanted to change locations, or he could move with them attached to the line, in which case he risked the danger of entanglement of the hooks in the vines, bushes or other obstructions. There was also the danger of exposed hooks catching on clothing or the exposed body of the fisherman or anyone in close proximity to him.

Among the many attempts to solve this problem was the provision of cork handles on the ends of fishing poles to which the fishing hooks were attached. This has the disadvantage of leaving the barbs of the hooks exposed and the accompanying danger of accidental snagging on clothing or bushes or the puncturing of skin.

The present invention comprises a device which can be used as an aid in baiting fishing hooks and as a temporary or permanent fishhook holder when the angler is moving to a different location or is not using the fishing pole. When used as a fishhook holder, the device can be attached to either the fishing pole or can be used independent of said pole, in which case it is attached to the angler's pocket, belt or the like.

SUMMARY OF THE INVENTION

The invention comprises an elongated hollow cylindrical container closed at one end and open at the other end. The open end is adapted to alternatively receive the handle of a fishing pole or a cap. A pocket clip for ready attachment to a pocket or belt is provided on the exterior of the container extending longitudinally thereof and attached to the container near the open end thereof. Two holes, running transversely through the container and located opposite each other are provided near the open end of the container to permit passage of a chain therethrough. An eyelet adapted to detachably retain a chain is provided at the open end of the container.

A hollow, removable tubular member having a groove on its exterior surface extending longitudinally from end to end thereof may be slidably mounted within said container. The tubular member serves to secure the hooks in the bottom of the container and can be easily withdrawn by simply pulling on the fishing line to which the hooks are attached. The chain is removably secured to an eyelet provided at the open end of the container and can be threadedly passed through the two holes, thereby securing the tubular member within the container. Alternatively, the chain may be attached to the fishing pole, thereby securing the container to the pole.

The device of the present invention serves three different functions. It can be used as a permanent container for hooks and sinkers independent of the fishing pole. In this form it is removed from the fishing pole and attached to a pocket, belt, or the like. The hooks and lures are doubly secured inside the container by means of the tubular member which is kept within the container by means of the chain extending transversely across the open end of said container through the holes provided therefor and by a cap which can be fitted to the open end.

The fishing accessory can also be used for temporary storage of the hooks, lures and weights. In this form it is secured to the pole by means of the chain. The hooks and lures, attached to the fishing line, are kept in the bottom of the container by means of the tubular member which is itself kept within the container by means of the pole handle inserted into the open end of the container.

The fishing accessory device of the present invention may also be used as an aid for baiting hooks. In this form the container is attached to a shirt or belt, and the sinker is placed inside the container with the hooks hanging outside and in close proximity thereto. The weight of the sinker insures that it will remain in the bottom of said container and that the hooks will hang on said line. This allows the fisherman to bait the hooks without unnecessary difficulty and can allow him the use of both hands for this purpose.

BRIEF DESCRIPTION OF THE DRAWINGS

FIG. 1 is a perspective view showing part of a fishing pole, a fishing reel, and the fishing accessory of the present invention mounted on the handle of the pole.

FIG. 2 is a perspective view similar to FIG. 1 and showing the fishing accessory secured to the fishing reel when used to store hooks and sinkers mounted on a fishing pole having a handle over which the fishing accessory will not extend.

FIG. 3 is an enlarged longitudinal cross sectional view of the fishing accessory illustrated in FIG. 1 taken substantially on line 3—3 in FIG. 1.

FIG. 4 is an enlarged transverse cross section view of the fishing accessory of FIG. 1 taken substantially on line 4—4 in FIG. 1.

FIG. 5 is an enlarged perspective view of the tubular member of the fishing accessory illustrated in FIG. 1.

FIG. 6 is an enlarged perspective view of a cap for the fishing accessory of FIG. 1.

FIG. 7 is an enlarged, partly broken away, partial elevation view of the open end of the tubular member of the fishing accessory of FIG. 1.

FIG. 8 is an enlarged longitudinal cross section view of the fishing accessory illustrated in FIG. 1 in use as an aid for baiting fishing hooks.

DESCRIPTION OF THE PREFERRED EMBODIMENTS

The fishing accessory of the present invention, as generally designated in FIG. 1 by the reference numeral 10, is intended to be removably secured to a fishing pole 12, as shown in FIGS. 1 or 2, or to be attached to a shirt pocket, belt, or the like, as shown in FIG. 8. As illustrated in FIGS. 1 and 2, the fishing accessory 10 serves as a pole-mounted storage container for hooks 14 and sinkers 16. As illustrated in FIG. 8, the fishing accessory 10 serves as an aid for baiting the hooks 14. It may also be used as a permanent storage container independent of the fishing pole.

As illustrated in FIG. 1, the fishing pole 12 includes an elongated handle 18 having attached thereto a fishing reel 20. A flexible rod 22 including eyelets 24 for guiding a fishing line 26 wound on the reel 20 is also attached to the handle 18.

The fishing accessory 10 includes an elongated hollow cylindrical container 28 having a closed end 30 and an open end 32. The closed end 30 may be concave or of any other suitable shape. A lip 34 is provided at the open end 32. A pocket clip 36 is provided on the exterior of container 28 extending longitudinally along the container and attached to the container near the open end 32 thereof. An eyelet 38 is provided near the open end 32 of container 28 through which a small chain 40 may be threaded. The container 28 may be secured to the fishing pole 12 by passing the chain 40 through the eyelet 38 and then securing the chain around the base 42 or handle 44 of the reel 20.

A tubular member 46 having a groove 48 in its outer surface extending longitudinally from end to end thereof, as shown in FIG. 5, is provided as a part of fishing accessory 10 and is adapted to be slidably mounted within the container 28.

Two holes 50 and 52 running transversely through the container and located substantially opposite each other are provided near the open end of said container, as shown best in FIG. 7. The chain 40 may be passed through the holes 50 and 52 with the fishing accessory 10 in use, as shown in FIG. 2, for example, to retain the tubular member 46 and therefore the hooks 14 and sinker 16 within the container 28.

When using the fishing accessory device 10 as a pole-mounted storage container, the hooks 14 and sinkers 16 are placed within the container 28, as illustrated in FIG. 3. The tubular member 46 is then slidably inserted into the container with the fishing line 26 located in the groove 48. The handle 18 of the fishing pole 12 is then inserted in the container to move the tubular member 46 and therefore the hooks and sinker on line 26 toward the end 30 of the container 28 into the position shown in FIG. 3. The tubular member 46 keeps the hooks 14 in the bottom of the container 28 and prevents their becoming entangled with the line and each other. The chain 40 is then threaded through the eyelet 38 and is secured around the handle 44 of the reel 20 so as to prevent accidental removal of the container 28 from the pole handle 18.

To remove the hooks 14 and sinker 16 from the container, the chain 40 is disengaged by means of the snap chain connector 54 and removed from either the eyelet 38 or from around the handle 44 of reel 20. The container 28 is then removed from the handle 18 of the pole 12 and an outward force is exerted on the fishing line 26 in the container 28 to slidably remove the tubular member 46 from the container 28.

The whole process of storing the hooks and sinkers on the fishing pole and removing them therefrom can be accomplished easily in a minimum amount of time. A fisherman may thus take advantage of any opportunity that may present itself to change locations with a minimum amount of lost time and danger due to loose hooks on his fishing line.

If the fishing pole 12 has a handle 18 larger in diameter than the container 28, the fishing accessory 10 may be used as illustrated in FIG. 2. In this case, the hooks 14 and sinker 16 along with the tubular member 46 are positioned in the container 28, as before, and as shown best in FIG. 3. The chain 40 is then passed through the eyelet 38 through the holes 52 and 50 and then around the base 42 of the reel 20 after which the ends of the chain 40 are connected by the snap chain connector 54. The cap 56 illustrated best in FIG. 6 may at this time be placed on the container 28. Thus, again the fisherman may change locations with a minimum amount of lost time and danger from exposed hooks on his fishing pole.

The fishing accessory 10 may also be used as a storage container for hooks, sinkers and lures independently of the fishing pole as indicated above. Thus, the fishing accessory may be carried in a shirt or coat pocket, being secured thereto by means of the clip 36. When utilizing the fishing accessory 10 as a container independent of the fishing pole, the hooks, sinkers and lures are placed in the container, and the tubular member 46 is slidably inserted into said container. The chain 40 is threaded through the eyelet 38 and then through the two transversely located holes 50 and 52, as illustrated in FIG. 2. This insures that the tubular member 46 will not accidentally slide out of the container. In addition the cap 56 having slot 58 may be inserted into the open end 32 of container 28 with line 26 extending through slot 58 to further secure the hooks within the container against accidentally falling out.

In use of the fishing accessory 10 as a device for aiding in the baiting of hooks, the container 28 is attached by means of the pocket clip 36 to the pocket or belt of the fisherman, as shown in FIG. 8. The sinker 16 is placed in the container 28 with the hooks 14 hanging outside and in close proximity thereto. Since the weight of the sinker is greater than the combined weight of the line 26 and the hooks, the sinker remains in the bottom of the container. To ensure that the sinker remains in the bottom of the container even if the angler bends over, the tubular member 46 may be slidably inserted into the container 28 in a manner such that the sinker 16 is in the bottom of the container with the tubular member on top of and surrounding the sinker and the fishing line 26 is located in the groove 48. The hooks 14 thus hang suspended from the line 26 near the container 28 and within easy reach of the fisherman. The fisherman can therefore easily bait the hooks using both hands, if desired. After the hooks have been baited, the sinker is removed from the container and fishing can commence without delay.

While one embodiment of the present invention and modifications thereof are disclosed in detail, it will be understood that other embodiments and modifications are contemplated. It is the intention to include all modifications and embodiments in the invention as are defined by the appended claims.

What I claim as my invention is:

1. A fishing accessory comprising an elongated hollow cylindrical container closed at one end and open at the other end for receiving at least one of hook and sinker members secured to a fishing line therein to hole the members while transporting a fishing pole to which the fishing line is secured and baiting the hook members, means for retaining the hook and sinker members within the hollow cylindrical container including a tubular member having an axially extending groove in one side thereof through which the fishing line extends over the entire length thereof adapted to slidably fit within the cylindrical container and means connected to the cylindrical container for securing the cylindrical container to at least one of a fishing pole to which hooks and sinkers are secured by means of a fishing line and a fisherman's clothing.

2. The fishing accessory as claimed in claim 1, wherein the means for securing the cylindrical container to at least one of a fishing pole and a fisherman's clothing includes an eyelet secured to the cylindrical container adjacent the open end thereof, a chain passed through the eyelet, and means for connecting the opposite ends of the chain after inserting the handle of the fishing pole within the open end of the cylindrical container and passing the chain around a portion of a reel secured to the fishing pole.

3. The fishing accessory as claimed in claim 1, wherein the means for securing the cylindrical container to at least one of a fishing pole and a fisherman's clothing includes a pair of transverse openings extending through the cylindrical container at opposite sides thereof, and a chain adapted to extend through the openings between the opposite sides of the container at the open end thereof, and means for connecting the opposite ends of the chain after passing the chain around a reel on the fishing pole.

4. A fishing accessory comprising an elongated hollow cylindrical container closed at one end and open at the other end for receiving at least one of hook and sinker members secured to a fishing line therein to hold the members while transporting a fishing pole to which the fishing line is secured and baiting the hook members and means connected to the cylindrical container for securing the cylindrical container to at least one of a fishing pole to which hooks and sinkers are secured by means of a fishing line and a fisherman's clothing including an eyelet secured to the cylindrical container adjacent the open end thereof, a chain passed through the eyelet, and means for connecting the opposite ends of the chain after inserting the handle of the fishing pole within the open end of the cylindrical container and passing the chain around a portion of a reel secured to the fishing pole.

5. A fishing accessory comprising an elongated hollow cylindrical container closed at one end and open at the other end for receiving at least one of hook and sinker members secured to a fishing line therein to hold the members while transporting a fishing pole to which the fishing line is secured and baiting the hook members and means connected to the cylindrical container for securing the cylindrical container to at least one of a fishing pole to which hooks and sinkers are secured by means of a fishing line and a fisherman's clothing including a pair of transverse openings extending through the cylindrical container at opposite sides thereof, and a chain adapted to extend through the openings between the opposite sides of the container at the open end thereof, and means for connecting the opposite ends of the chain after passing the chain around a reel on the fishing pole.

6. The method of storing fish hooks and sinkers when not in use comprising positioning the fish hooks and sinkers within a hollow cylindrical container closed at one end and open at the other, securing the hollow cylindrical container to a fishing pole to which the hooks and sinkers are attached by passing a chain secured to the container around a fishing reel secured to the fishing pole and retaining the hooks and sinkers within the hollow cylindrical container attached to the fishing pole by placing a tubular member within the hollow cylindrical container after the hooks and sinkers have been placed therein and inserting the handle of the fishing pole to which the hooks and sinkers are secured by a fishing line within the end of the hollow cylindrical container.

7. The method of storing fish hooks and sinkers when not in use comprising positioning the fish hooks and sinkers within a hollow cylindrical container closed at one end and open at the other, retaining the hooks and sinkers within the hollow cylindrical container by placing a tubular member within the hollow cylindrical container after the hooks and sinkers have been placed therein, and passing a chain through the hollow cylindrical container adjacent the open end thereof after the tubular member has been placed in the hollow cylindrical container and securing the hollow cylindrical container to a fishing pole to which the hooks and sinkers are attached by passing the chain about a fishing reel secured to the fishing pole.

* * * * *